Dec. 11, 1945.  H. V. HOFFMAN ET AL  2,390,649
INDEXING MECHANISM
Filed May 22, 1944  4 Sheets-Sheet 1
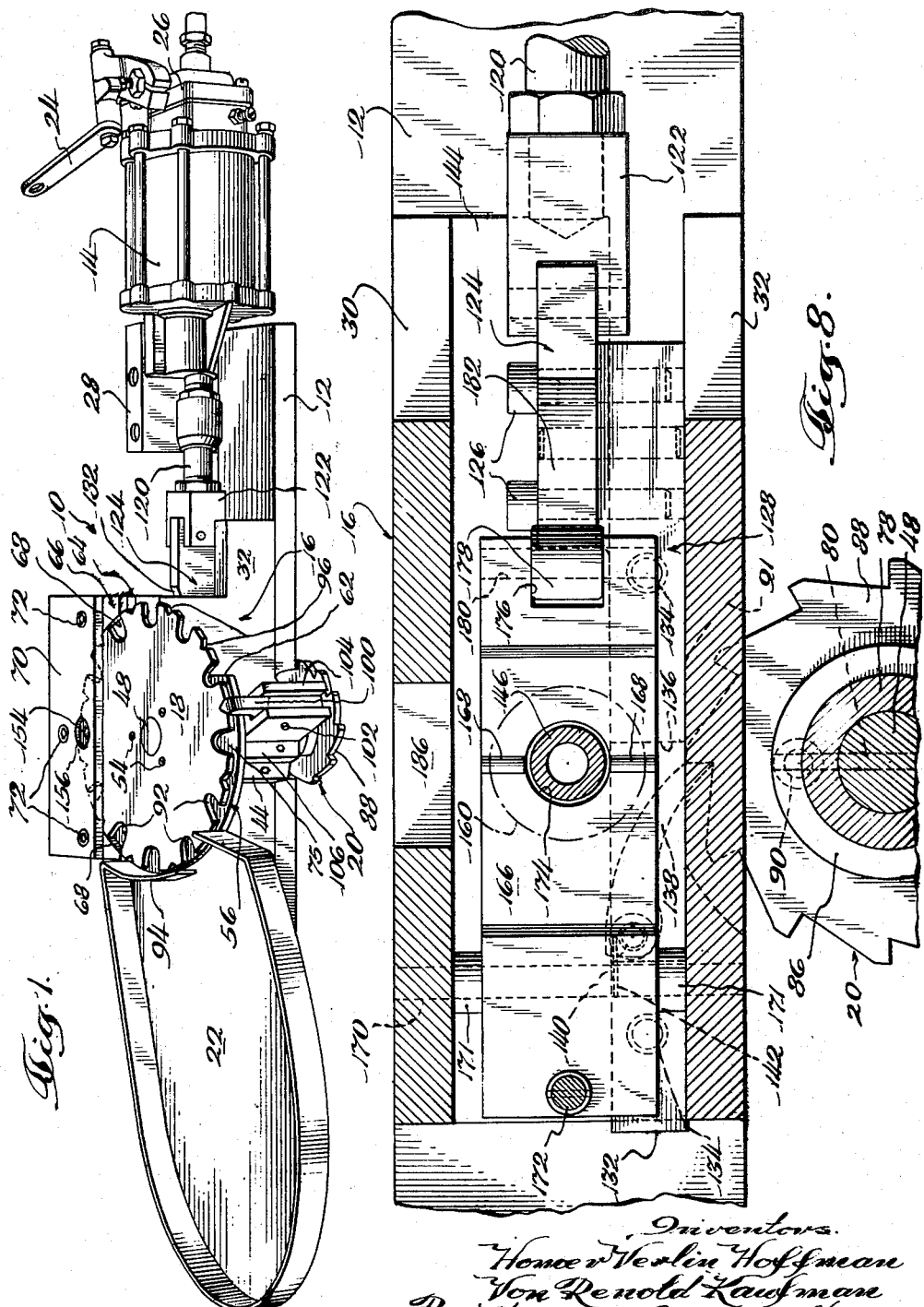

Dec. 11, 1945.  H. V. HOFFMAN ET AL  2,390,649
INDEXING MECHANISM
Filed May 22, 1944  4 Sheets-Sheet 2
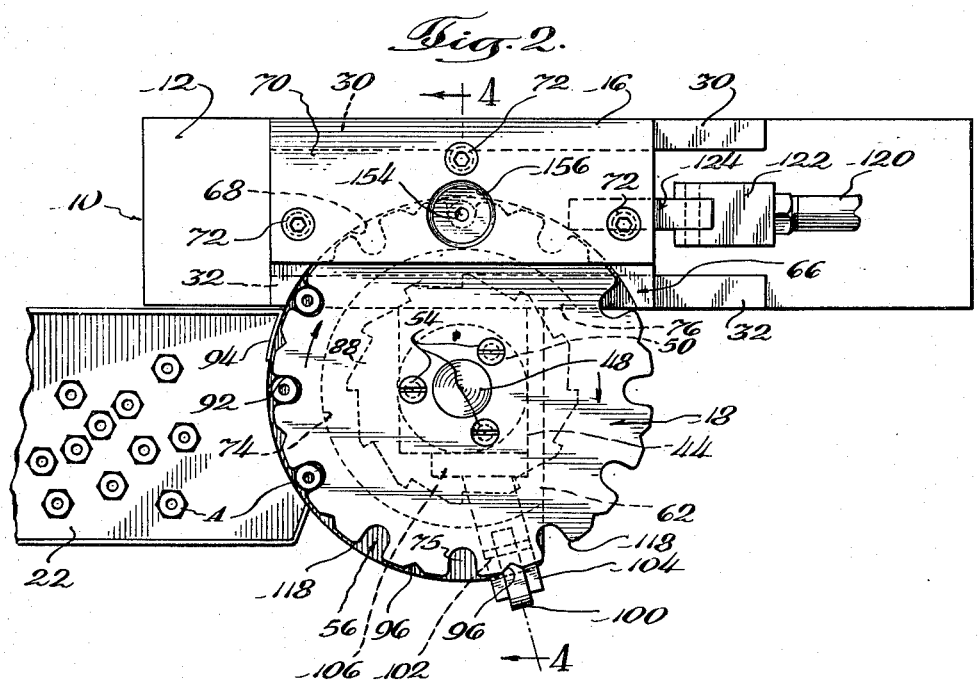
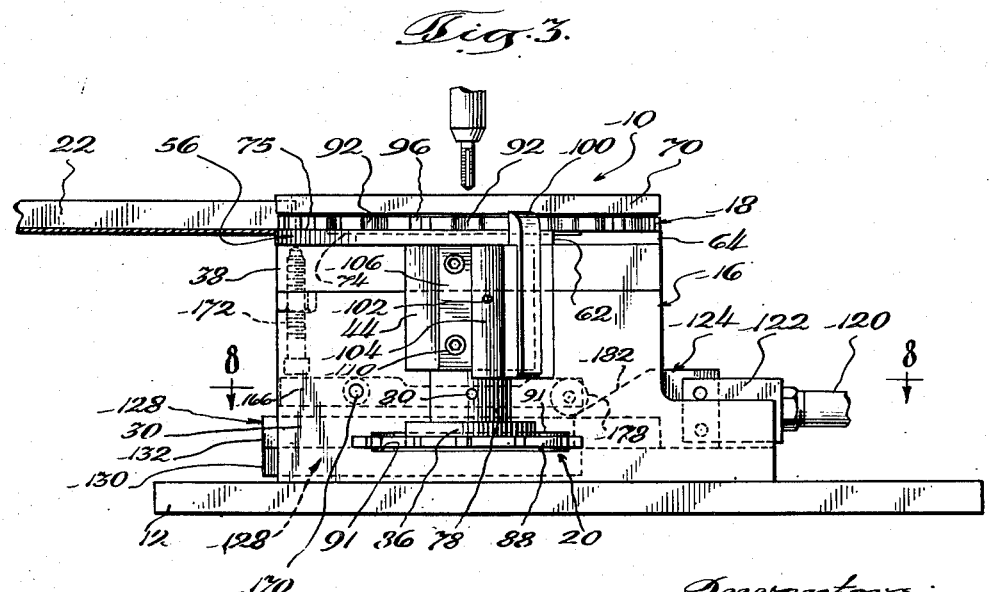

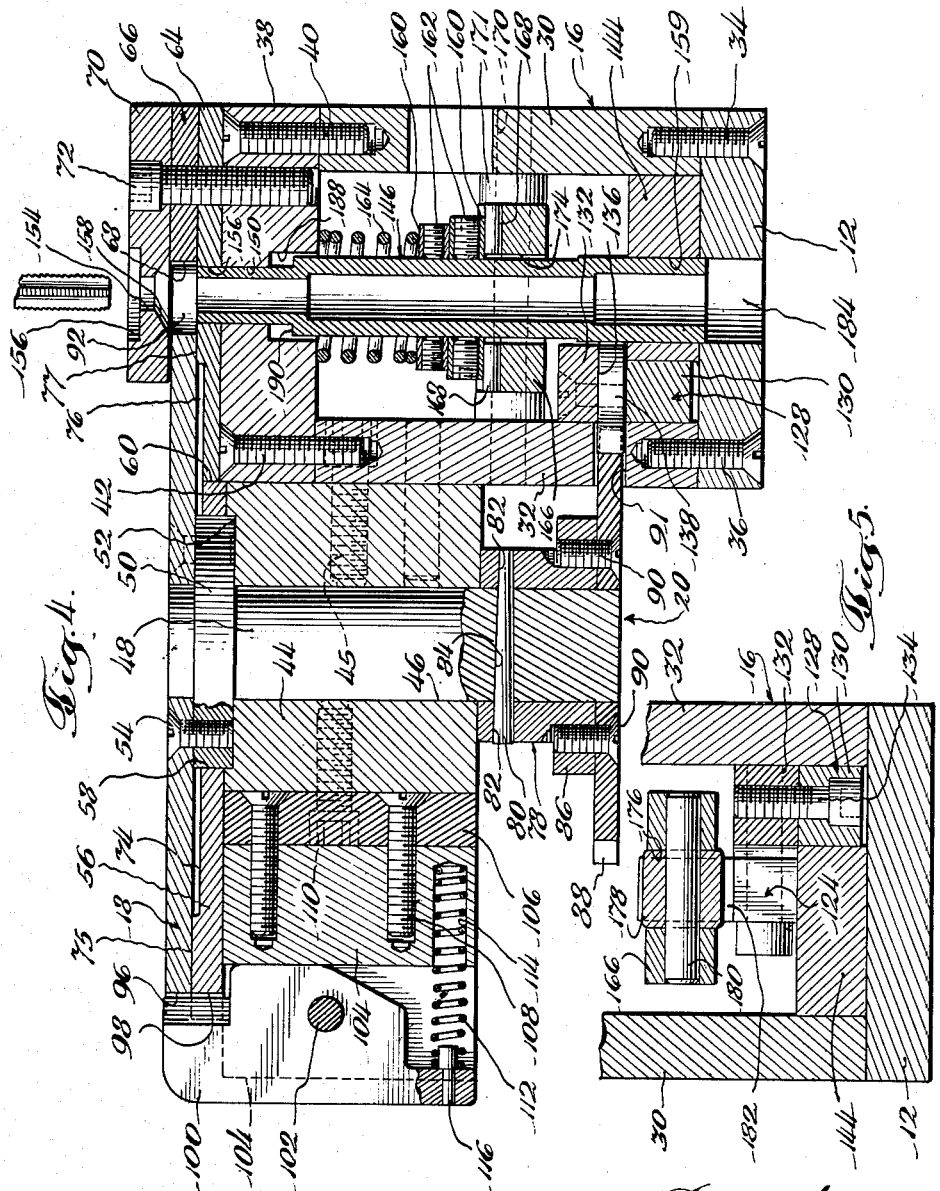

Dec. 11, 1945.    H. V. HOFFMAN ET AL    2,390,649
INDEXING MECHANISM
Filed May 22, 1944    4 Sheets-Sheet 4

Inventors.
Homer Verlin Hoffman
Von Renold Kaufman
By Williams, Bradbury & Hinkle
attorneys Patented Dec. 11, 1945

2,390,649

UNITED STATES PATENT OFFICE 2,390,649

INDEXING MECHANISM

Homer Verlin Hoffman, South Whitley, and Von Renold Kaufman, Pierceton, Ind., assignors to K M & H Corporation, Fort Wayne, Ind., a corporation of Indiana Application May 22, 1944, Serial No. 536,732

14 Claims. (Cl. 10—107)

Our invention relates to an indexing mechanism, and in particular to a fixture in which a nut blank is positioned and held for a precision tapping operation.

The precision tool industry has long sought a compact, inexpensive, and yet accurate machine which would position and hold standard nut blanks for the tapping operation. This machine must also be capable of automatic operation, and for synchronization with the operation of the tapping tool. Our invention contemplates such a device.

The principal object of our invention is the provision of a novel indexing mechanism or precision tapping fixture, wherein a standard nut blank is moved to tapping position, secured during the tapping operation and discharged from the device.

Another object of the present invention is to provide a novel precision tapping fixture which is fully automatic in its operation.

Another object of the present invention is to provide a novel precision tapping fixture which may be used with ease with a large number of different types and makes of tapping tools.

A further object of the present invention is to provide a novel precision tapping fixture wherein its operations may be synchronized with the tapping tool with which it is used.

Still a further object of the present invention is to provide a novel indexing mechanism which is compact and inexpensive, yet accurate in operation.

Another object of the present invention is to provide a novel precision tapping fixture in which necessary adjustments may be made without the necessity of disassembling the machine to any great extent.

A further object of the present invention is to provide a novel precision tapping fixture wherein the chips of metal are disposed of so that they will not easily work in between moving parts of the fixture.

And still another object is to provide a device which is very simple in construction and can be thoroughly cleaned with ease.

Other objects and advantages will become apparent from the following description taken in conjunction with the drawings, of which there are four sheets, and in which, Fig. 1 is a perspective view of our improved indexing mechanism;

Fig. 2 is a top plan view of the most important portions of the mechanism with a portion of the feeding tray and the power cylinder omitted;

Fig. 3 is a front elevational view of that portion of the device illustrated in Fig. 2;

Fig. 4 is a cross-sectional view on an enlarged scale taken substantially on the line 4—4 of Fig 2;

Fig. 5 is a cross-sectional view taken on the line 5—5 of Fig. 6;

Fig. 8 is a plan view of the stepping mechanism and may be considered as taken substantially on the line 8—8 of Fig. 3.

Figure 6:
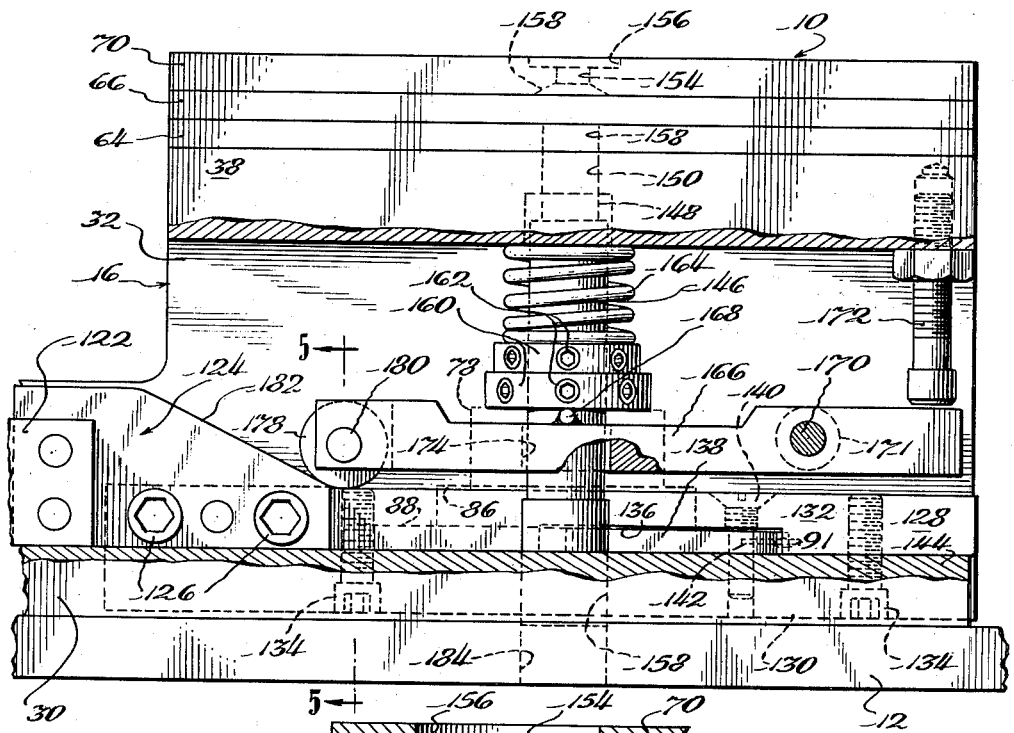
Fig. 6 is a rear elevational view of the indexing mechanism with the power cylinder and feeding tray omitted, and with the rear wall partially broken away better to illustrate that portion of the mechanism within the housing.

Referring to Fig. 1, it will be seen that our indexing mechanism 10 is mounted on a bed plate 12 and comprises in general a power cylinder 14, a housing 16, a notched table or plate 18, and a tray 22 from which the nut blanks are fed. The power cylinder 14 may be of any standard type and may be operated either by hydraulic or air pressure. The cylinder illustrated is operated by air pressure and is of the double acting type; it is provided with adjustable stops to limit its movement in either direction. A link 24 operating an air valve 26 is provided to connect the power cylinder 14 to the tapping tool so that the operation of the fixture may be synchronized with that of the tapping tool. The cylinder 14 is mounted on a block 28 which is in turn bolted to the fixture bed 12.

The housing 16 is formed by a pair of vertical plates 30, 32 which are bolted to the bed by bolts 34, 36 and by a block 38 bolted to the top edges of the plates 30, 32 by bolts 40, 42. A bearing block 44 is bolted to the outside of the front wall 32 of the housing by bolts 45 and is formed with a vertically disposed bore 46. A vertically disposed shaft 48 is rotatably mounted in the bore 46 of the bearing block 44. The shaft 48 is provided with a circumferential bearing flange 50 which is fitted into a suitable circular bearing 52 formed in the top of the bearing block 44 concentric with the bore 46. The notched table 18 is secured to the shaft 48 by bolts 54 which pass through suitable openings in the table 18 and into tapped holes in the flange 50.

A plate 56 is secured to the top of the bearing block 44 and lies beneath the notched table 18; the plate 56 is provided with a circular opening 58 to receive the circular bearing flange 50. The partly circular configuration of the plate 56 is indicated in Fig. 2, and it will be noted that it has a slightly larger radius than the table 18, but is cut off along a chord so as to be flush with the joint between the housing 16 and the bearing block 44, as shown at 60 in Fig. 4, and it is cut off along another chord at 62 (see Fig. 2) to provide a space where the tapped nuts may be dropped free of the notched table 18, as will be more fully disclosed hereinafter.

The housing 16 is provided with a top plate 64 of case-hardened steel which has its upper surface flush with the upper surface of the plate 56. The plate 64 lies over the block 36 and has the same general dimensions as this block. Positioned on top of the plate 64 is guide plate 66, which has an arcuately formed edge 68 faced toward the outer edge or periphery of the table 18. The radius of the arcuately formed edge 68 is only slightly greater than the radius of the table 18, and its function will appear presently. A cover plate 70 lies over the plate 66 and over that portion of the notched table 18 which is adjacent the arcuate edge 68. The plates 64, 66, and 70 are secured to the top of the housing 16 by suitable bolts 72. The plates 56 and 64 are formed with depressions 74 and 76, respectively, which are concentric with the axis of the shaft 48 so that any chips of metal which may find their way beneath the notched table may be trapped and will not score the under surface of the table 18.

The thickness of the table 18 is only slightly less than the depth of the nut blank which is being machined, and the slot formed by the plates 64, 66 and 70 has a height sufficient to permit the nut blanks to be passed therethrough. It will be seen from Figs. 2 and 4 that the outer edge 75 of the plate 56 and the surface 77 of the plate 64 bear against the underside of the table 18 and form a track on which the nut blanks and tapped nuts may be slid by the rotational movement of the table 18. As the finished nuts emerge from the slot, they drop off the track and free of the table 18 into a suitable receptacle.

A sleeve 78 is mounted on the lower end of the vertical shaft 48 by means of a tapered pin 80 which passes through holes 82 in the sleeve 78 and the tapered bore 84 in the shaft 48. The sleeve 78 is so positioned that its upper end bears lightly against the lower face of the bearing block 44 when the bearing flange 50 is seated in the circular bearing 52; this arrangement prevents the shaft 48 from moving vertically, but does not present appreciable friction which would retard the relatively free rotation of the shaft 48 and its associated parts. At the lower end of the sleeve there is provided an integral flange 86 to which a ratchet wheel 88 is secured by bolts 90. One edge of the ratchet wheel projects through an opening 91 in the wall 32 of the housing 16. The function of the ratchet wheel 88 in the rotation of table 18 will appear presently.

Two sets of notches are cut in the periphery of the table 18. One of these sets is composed of a plurality of U-shaped recesses 92 which are sufficiently wide to receive a standard nut blank—for instance, a hexagonal nut blank—across opposed flat faces thereof. The nut blanks are placed in the recesses 92 by hand from the tray 22, and as the table is rotated in a clockwise direction (Figs. 1 and 2) the pointed edges of the blank contact an upstanding flange 94 on the tray 22 so that the blank is properly positioned in the recesses 92; the nut blank is held in this relative position by the arcuate edge 68 of the plate 66.

The second set of notches is composed of a plurality of shallow V-shaped recesses 96 which are positioned intermediate the U-shaped recesses 92, there being an equal number of each of the recesses 92 and 96. A similarly shaped, but very slightly larger, notch 98 is formed in the periphery of plate 56 and each of the notches 96 coincides with this notch when the notches 92 present a nut blank at the tapping position. The table 18 is prevented from rotation during the tapping operation by a detent 100 which engages in the coinciding notches 96, 98. The detent 100 is pivotally mounted on a shaft 102 which is mounted in a block 104 bolted to a plate 106 by suitable bolts 108. Because the notches 96 are placed intermediate adjacent notches 92, the detent 100 may not be positioned diametrically opposite the tapping position and the block 104 is formed with non-parallel edges so that it will hold the detent 100 in the proper position. The plate 106 is mounted to the bearing block 44 by bolts 110. So that the detent will have a positive action it is urged toward notch-engaging position by a spring 112 which is held in a bore 114 in the block 104 and is engaged at its free end by a pin 116 mounted in the lower end of the detent 100.

As the table is rotated under the influence of the stepping mechanism 20, the detent 100 is disengaged from the notch 96 by the force of the movement and is prevented from entering into the recesses 92 by the notch 98. The wide V-shape of the notches 96 facilitates the operation of disengaging the detent 100 which is moved against the spring 112 by the force of the rotational movement of the stepping mechanism 20; it readily disengages itself from the notches 92 by reason of the curved edges 118 joining the U-shaped notches 92 with the periphery of the table 18. The detent 100 does not enter into the notches 92 very far due to the retarding effect of the notch 98 in the plate 56, and, hence, there is relatively little resistance given either by notches 92 or 96 to the force exerted by the stepping mechanism 20 in rotating the table 18 the distance between adjacent notches 92.

As has been previously set out, the stepping mechanism 20 actuates the table 18 so that it will move the distance between adjacent notches 92, and the stepping mechanism also positions the nut blank so that it will be engaged by the tapping tool without movement in any direction. This mechanism is operated by the power cylinder 14 and is connected thereto by the piston rod 120 of the power cylinder. A yoke 122 which is adapted to receive a cam block 124's secured to the outer end of the piston rod. Bolted to the lower edge of the cam block 124 by bolts 126 is a reciprocating member 128 which is formed by a pair of bars 130, 132 secured together by bolts 134. The upper bar 132 is formed with a recess 136 in its lower face which provides an opening for the reception of a pawl 138. The pawl is pivotally mounted on a bolt or stud 140 passed through the bars 132, 130 and is biased against the ratchet wheel 88 by a pawl spring 142. The member 128 is prevented from sidewise movement by a guide 144 mounted in the lower part of the housing 16 on the upper surface of the bed 12. The pawl 138 advances the ratchet wheel 88 one notch, which corresponds to the spacing between adjacent notches 92 on table 18 on the retractile movement of the piston rod 120 by the power cylinder 14. On the power stroke of the cylinder the pawl 138 rides over the next tooth of the ratchet wheel 88 and positions itself for another advancing movement of the stepping mechanism. There is a slight lost motion between the pawl 138 and the ratchet wheel 88 so that the finished nut can be released by the clamping mechanism before the table 18 is rotated. Fig. 8 illustrates the parts in the position they have immediately after the cam block 124 has been disengaged from the clamping mechanism and just before the ratchet wheel 88 is rotated by the pawl 138 and the member 128.

Figure 7:
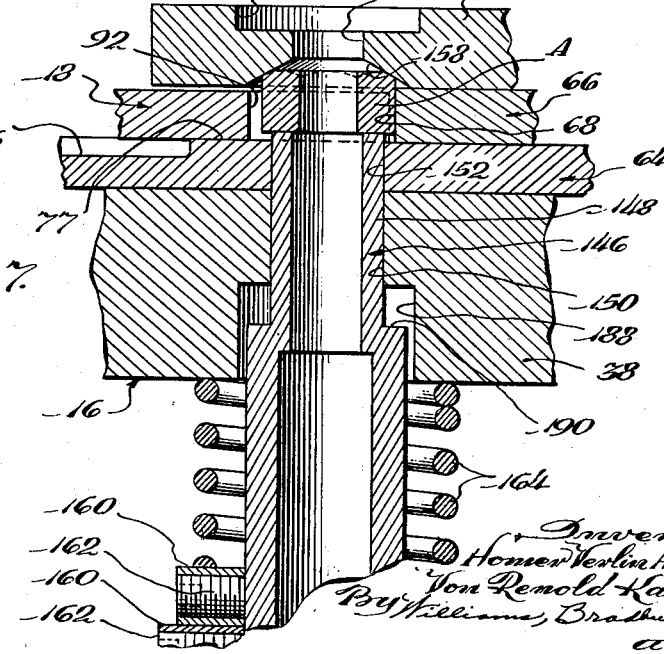
Fig. 7 is an enlarged sectional view taken through the plunger, showing a nut blank in tapping position.

As most clearly seen in Fig. 7, the nut blank A is held in position for the tapping operation by a vertically reciprocable hollow plunger 146. The plunger 146 is almost as long as the height of the housing and is provided at its upper end with a portion of reduced diameter 148 which passes through a bore 150 in the block 38, a hole 152 in the plate 64, and into the space which is formed by the facing edges of the recesses 92 and the arcuate faces 68 of the plate 66. The cover plate 70 at the tapping position is provided with a hole 154 which is counterbored at 156 on its upper surface and is tapered outwardly at 158 to form a conical seat on the lower surface of the plate 70 concentric with the hole 154. The chamfered edges of the nut A engage in the conical seat 158 when the plunger 146 is forced upwardly by the stepping mechanism. The top of the plunger 146 is machined so that its end surface is perpendicular to its central axis, and thus the nut blank is properly positioned with its opening concentric with the bore 154, which in turn is concentric with the tap, and with its flat bottom face perfectly square with the axis of the tap. The lower end of the plunger 146 is guided in a bore 159 which is drilled in the guide block 144 so that there will be no wobbling movement of the plunger 146 as it is reciprocated vertically. Intermediate its ends a pair of collars 160 are positioned and are locked in place by set screws 162. A spring 164 is secured between the upper collar 160 and the lower face of the block 38 so that the plunger 146 will be constantly urged in a downward direction. The downward movement of the spring 164 is resisted by a pivotally mounted lever 166 which has brazed to its upper surface a pair of fulcrum elements 168. As seen most clearly in Fig. 6, the lever 166 is pivoted on a shaft 170 which is mounted in the walls 30, 32 of the housing. A pair of spacer sleeves 171 position the lever on the shaft 170 and the extent of its movement in a counter-clockwise direction (Fig. 6) is resisted by an adjustable stop 172. The lever 166 is provided with a bore 174 through which passes the plunger 146. At its opposite extremity the lever 166 is forked to provide a recess 176 for the reception of a roller 178 mounted on a shaft 180. The roller 178 is adapted to engage on the cam surface 182 of the cam block 124 when the power cylinder 14 moves the cam block to the right (Fig. 6). When this happens the lever 166 will pivot on the shaft 170 and will move the plunger 146 upwardly against the force of the spring 164.

Before the device is operated it is essential that the plunger 146 be positioned so that its upper surface is flush with the surface 77 of the plate 64. This is done by sliding the plunger 146 relative to the collars 160 and tightening the set screws 162. An opening 186 is provided in the wall 30 so that a screw driver or Allen wrench may be inserted to adjust the set screws 162. The table 18 and the plate 66 with the arcuate edge 68 may be changed to accommodate nut blanks of varying sizes. The change is readily made by removing the bolts 54 and 72 and substituting a different set of table and plate. The differences between the different sets lie in the thickness of the table and plate and the size of the recesses 92.

As clearly seen in Fig. 7, the bore 150 is counterbored at 188 and the end of the counterbore is adapted to engage a shoulder 190 at the base of the reduced diameter section 148 should the plunger 146 be moved upwardly by the clamping mechanism when an empty recess 92 is moved to the tapping position during the operation of the device.

The operation of the indexing mechanism is as follows: After the operation of the indexing mechanism has been synchronized to the operation of the tapping tool, a supply of nut blanks are placed in the tray 22. The nut blanks are then placed by hand in the recesses 92 of the table 18 and the device is started to operate with the operation of the tapping tool. As the tap approaches the fixture the power cylinder 14 is adapted to commence a power stroke and to move the piston rod and its associated parts toward the left (Figs. 1, 2, 3 and 8), or toward the right (Fig. 6). As the power stroke is continued the cam surface 182 engages the roller 178 raising the lever 166 about the pivot 170. This movement causes the fulcrum point 168 to be raised against the force of the spring 164 and because the spring 164 maintains the collars 160 constantly against the fulcrum, the plunger 146 is raised in its guide bores 159, 150. Assuming that a nut blank has been moved into position above the reciprocating plunger 146, its lower face will be engaged by the upper face of the plunger 146, and its chamfered face will engage in the conical seat 158, so that the bore of the nut blank will be concentric with the bore of the opening 154 and concentric with the axis of the tap. The power will continuously be applied by the cylinder 14 all during the tapping operation, which means that the nut will be held in the position shown in Fig. 7 during this time. As the tap forms the thread on the interior of the nuts, the chips of metal will drop down through the interior of the plunger 146 and through the opening 184 in the bed plate 12 to a suitable receptacle.

After the tap has been removed at the completion of the tapping operation, the valve 26 is actuated to reverse the action of the cylinder which commences a retractile stroke. On this movement of the cylinder the cam surface 182 will be drawn from engagement with the rollers 178 and the spring 164 will force the plunger 146 to its retracted position. This will drop the nut back onto the surface 77 of the plate 64. As soon as the nut has been returned to this position, the pawl 138, which has a slight lost motion, will engage a tooth in the ratchet wheel 88 moving it one notch, thereby sweeping the completed nut away from the tapping position and bringing up another nut blank to the tapping position. When this step has been completed the fixture is conditioned for another sequence of operations.

During the time the nut blank A was in its position over the plunger 146, the detent 100 engaged in the notches 96 and 98. During the stepping operation the detent was forced out of engagement with the notches 96 and 98 and the edge of the detent rides on the periphery of the table 18. As the table 18 passes a notch 92 by the detent it temporarily drops into this opening.

but due to the curved surface 118 joining the edges of the notch 92 with the periphery of the table 18, the detent is readily disengaged from notch 92.

It will be recognized that although the foregoing description refers to the use of this indexing mechanism with a tapping machine and describes it as handling nut blanks, the mechanism is equally well adapted for feeding and positioning other blanks of non-circular outline or provided with a pair of opposite flat faces adapted to fit between the sides of the notches 92 in the table 18; and the mechanism is adapted for holding such parts not only for tapping but for drilling, reaming, milling and various other operations in which the employment of this mechanism will prove a factor contributing notably to high speed production.

While we have described and disclosed only one embodiment of our invention, it will be apparent to those skilled in the art that numerous minor changes and modifications may be made therein without departing from the spirit and scope of our invention, and, therefore, we desire to be limited only by the appended claims.

What we claim as new and useful and desire to secure by United States Letters Patent is:

1. An indexing mechanism of the class described, comprising a rotatable table having blank receiving notches in its periphery each dimensioned to receive a blank in a definite position relative to said table, means for rotating said table the distance between centers of adjacent blank receiving notches, guide means for retaining each of said blanks in a receiving notch in said definite position relative to said table, and clamping means engaging a blank independently of the table and holding said blank in position during a work operation.

2. An indexing mechanism of the class described, a rotatable table having blank receiving notches in its periphery each dimensioned to receive a blank in a definite position relative to said table and means for rotating said table the distance between centers of adjacent blank receiving notches, a blank in one of said notches being thereby centered relative to a tool of the machine, guide means retaining each of the blanks in a blank receiving notch in the said definite position during rotation of said table, and clamping means engaging a blank independently of the table and cooperating with said notch for holding the blank in position during a work operation.

3. An indexing mechanism of the class described, comprising a power cylinder, a rotatable table having blank receiving notches in its periphery, means operatively connected to said power cylinder for rotating said table the distance between centers of adjacent blank receiving notches for each stroke of said power cylinder in one direction, guide means positioning each of the blanks in a receiving notch in correct position relative to the tool of the machine, and clamping means engaging a blank independently of the table for holding the blank in position during a work operation, said clamping means being operatively connected to said power cylinder and adapted to be actuated to clamping position by said power cylinder on a stroke in the other direction.

4. An indexing mechanism of the class described for the step-by-step advancements of a blank to a position in which it may have a work operation performed thereon, including in combination a rotatable table having blank receiving notches in the periphery thereof, a stepping mechanism adapted to advance said table the distance between centers of adjacent notches, clamping means at the work position adapted to engage a blank independently of the table and to hold it during a work operation, and a power cylinder operatively connected to said stepping mechanism and to said clamping means whereby said stepping mechanism will be actuated by said power cylinder on a stroke in one direction, and said clamping means will be moved to clamping position by said power cylinder on a stroke in the opposite direction.

5. An indexing mechanism of the class described, comprising in combination a housing, a bearing block mounted on one side of said housing, a shaft mounted for rotation in said bearing block, a table having blank receiving notches formed at regular intervals in its periphery secured to said shaft, a slot formed in said housing to receive a portion of said table so that at least one blank receiving notch is enclosed therein, an opening in said housing adapted to receive a tool, said opening coinciding with a notch of said table when the notch is enclosed in said slot, means for clamping the nut blank against a wall of said slot when its bore is axially aligned with said opening, and means for intermittently turning said shaft through the interval at which said notches are spaced and means alternately actuating said clamping means.

6. An indexing mechanism of the class described, comprising in combination a housing, a bearing block mounted on one side of said housing, a shaft mounted for rotation in said bearing block, a table having nut receiving notches formed in its periphery secured to said shaft, a slot formed in said housing to receive a portion of said table so that at least one nut receiving notch is enclosed therein, a plate located beneath said table cooperating with the lower wall of said slot to form a track on which the nut blanks may be slid by rotation of said table, an opening in said track within said slot, reciprocable clamping means movable through said opening, a break in said track to allow the tapped nut to drop free of said table, and means for intermittently and alternately actuating said shaft and said clamping means.

7. In an indexing mechanism, the combination of a rotatable circular table having nut blank receiving notches in its periphery, a vertically disposed shaft to which said table is secured, bearing block means mounting said shaft for rotation, means for advancing said table the distance between notches comprising a ratchet wheel fixedly mounted on said shaft, a reciprocable bar having a pawl therein adapted to engage the tooth of said ratchet wheel to rotate said shaft when said bar is moved in one direction, means for reciprocating said bar, and restraining means for preventing rotational movement of said table when said bar is moved in the opposite direction comprising, a second set of notches in the periphery of said table alternating with said notches of the first set, a detent mounted on said bearing block, means adapted to engage in a notch of said second set when the nut blank is in tapping position, and resilient means constantly urging said detent toward notch engaging position.

8. The combination set forth in claim 7, together with means by which said detent is prevented from fully entering into a notch of said first set, said detent having an inclined face engageable with the outer corner of a notch of said first set so that it is displaced from said notch when said table is rotated.

9. In an indexing mechanism of the class described, the combination of a rotatable circular table having nut blank receiving notches formed in its periphery, a housing having a slot formed therein to receive a portion of said table, said slot having an arcuate wall extending adjacent the periphery of the table an opening formed in said housing and communicating with said slot, nut blank clamping means reciprocable through said opening, means for advancing said table the distance between adjacent notches, said advancing means being so adjusted that it will bring successive notches to coincide with said opening at the end of each of its movements, a bore in said housing opposite said opening and through which a tap is adapted to pass during a tapping operation, and means for actuating said clamping means so that it will clamp the nut blank between its outer end and a wall of said slot.

10. In an indexing mechanism of the class described, the combination of a rotatable table having nut receiving notches in its periphery, means for advancing said table the distance between adjacent notches, a housing having a slot formed therein to receive an edge of said table so that at least one nut receiving notch is completely enclosed therein, an opening formed in a wall of said housing connecting the interior thereof with said slot, a hollow plunger reciprocable through said opening, an opening in the opposite wall of said housing smaller than a nut blank to admit a tool to operate on the blank, and means to actuate said plunger toward said opposite wall to nut clamping position when said table has positioned a nut blank in said slot coincident with the latter opening.

11. In an indexing mechanism of the class described, the combination of a rotatable table having nut receiving notches in its periphery, means to advance said table the distance between adjacent notches, a housing having an arcuately shaped slot formed in the top wall thereof to receive an edge of said table so that at least one nut receiving notch is completely enclosed therein, a bore in said top wall connecting the interior of said housing with said slot and through which a tap is adapted to pass, a conical seat coaxial with said bore on the interior of said slot, a hollow plunger reciprocable in said opening, said plunger being open at its lower end and normally having its upper face flush with the lower wall of said slot, and means to actuate said plunger toward said conical seat when said table has positioned a nut in said slot coincident with said opening and said wall, so that a nut will be clamped between the top face of said plunger and said conical seat to hold it in alignment with a tap.

12. An indexing mechanism of the class described, comprising a rotatable circular table having nut blank receiving notches in its periphery, the width of each notch being substantially the same as the width of a nut blank measured between opposite lateral faces thereof and the depth of each notch being substantially equal to the diameter of a nut blank measured between opposite corners thereof, arcuate guard means extending closely adjacent the periphery of the table to hold the blanks in place in said notches, and clamping means to engage the upper and lower faces of a nut blank to hold it in position during a tapping operation.

13. In an indexing mechanism as defined in claim 12, means operable intermittently to rotate said table and adapted to advance the table the distance between centers of adjacent notches at each actuation, and means for actuating said clamping means intermittently in alternation with said table rotating means.

14. In an indexing mechanism as defined in claim 12, means operable intermittently to rotate said table and adapted to advance the table the distance between centers of adjacent notches at each actuation, and restraining means for preventing rotational movement of said table except when so advanced, comprising a second set of notches in the periphery of said table alternating with said notches of the first set but of substantially less depth, a beveled detent positioned to engage in a notch of said second set when the nut blank is in tapping position, resilient means constantly urging said detent toward notch-engaging position, and means limiting movement of the detent in response to said resilient means at a position in which its beveled face will engage a corner of each nut receiving notch to be cammed outwardly thereby when the table is rotated.

HOMER VERLIN HOFFMAN.
VON RENOLD KAUFMAN.